United States Patent
Menzel

[11] 3,885,635
[45] May 27, 1975

[54] TWO-SPEED MECHANICAL QUILL FEED AND SPINDLE DRIVE MECHANISM FOR A MACHINE TOOL

[75] Inventor: Klaus Menzel, Orchard Lake, Mich.

[73] Assignee: The Bendix Corporation, Southfield, Mich.

[22] Filed: Apr. 19, 1974

[21] Appl. No.: 462,286

[52] U.S. Cl. .................. 173/146; 74/841; 408/137
[51] Int. Cl.² ....................... B23Q 5/40; E21C 5/02
[58] Field of Search ...... 173/19, 145, 146; 408/137; 175/114, 121; 74/841

[56] References Cited
UNITED STATES PATENTS

| | | | |
|---|---|---|---|
| 2,768,539 | 10/1956 | Wollenhaupt et al. | 173/19 |
| 2,905,440 | 9/1959 | Gerentes | 173/146 |
| 3,160,033 | 12/1964 | Moyer | 74/841 |
| 3,561,544 | 2/1971 | Farmer | 173/145 |

Primary Examiner—Ernest R. Purser
Attorney, Agent, or Firm—John R. Benefiel

[57] ABSTRACT

A two-speed mechanical quill and spindle drive mechanism is disclosed wherein the quill is advanced by means of a screw formed about its periphery and co-operating with a ball nut driven by a two-speed drive to provide rapid and machining infeed rates. The quill is received within a housing bore and accurately guided for longitudinal movement thereby by means of a sliding engagement with bore surfaces on either side of the nut. The spindle is carried by the quill throughout its longitudinal movement and is rotated by means of a splined drive shaft which maintains a rotative connection therewith by means of a splined connection therebetween.

The two-speed drive includes a motor driving the nut directly through gearing during rapid infeed of the quill, but which motor is itself driven through a clutch and reduction gearing by a second motor to produce the slow-speed infeed of the quill and which second motor also rotates the spindle by a driving connection with the splined drive shaft at a reduction during infeed.

Both of these motors are described in the preferred embodiment to be of the sliding armature type to provide simplified controls and a minimum of drive train components in carrying out this two-speed drive arrangement.

12 Claims, 13 Drawing Figures

TWO-SPEED MECHANICAL QUILL FEED AND SPINDLE DRIVE MECHANISM FOR A MACHINE TOOL

BACKGROUND OF THE INVENTION

1. Field of the Invention

This invention concerns quill drives for machine tools, and more specifically, two-speed mechanical quill drives.

2. Description of the Prior Art

Feed mechanisms for quill shafts of a type used in machine tools have been in use for many many years. In these mechanisms a quill shaft adapted to rotate a tool spindle is advanced linearly in order to feed the tool into the work. In many applications a two-speed advance is necessary or very desirable to provide a rapid traverse linear advance of the tool spindle until the tool approaches the workpiece at which point the advance is shifted to a low speed machining infeed rate, such rapid traverse reducing the cycle time of the particular machining operation.

While quite satisfactory hydraulic design approaches have existed in the past, current trends are for various reasons dictating a "mechanical" approach to the quill unit drive. Such mechanical drives developed to date have various drawbacks.

One such approach involves a screw actuator disposed parallel to the quill shaft which is rotated at two speeds to provide the two-speed advance of the quill shaft. An example of this design is found in U.S. Pat. No. 3,561,544. Another somewhat similar approach common also in single speed drill press type applications has involved a rack or cam drive of the quill shaft; such as shown in U.S. Pat. Nos. 2,545,008 and 2,902,891, as well as in German Pat. No. 846,807.

These approaches have the common difficulty of excessive runout of the spindle shaft since the feed forces are not aligned with the axis of motion of the quill shaft. While some attempts to overcome this problem have been made by a power screw arrangement concentric with the quill shaft as exemplified by U.S. Pat. Nos. 2,796,767; 2,975,440; 3,430,524; and 3,139,637, these designs require bearings on a spindle shaft forward of the screw shaft and hence are quite cumbersome, and runout problems may also exist due to the long unsupported screw portion overhung at one end of the quill shaft of the mechanism, and also frictional loads may be quite high.

A concentric ball screw advancing mechanism has been described in U.S. Pat. No. 3,640,147 which would substantially alleviate the friction loads, but this design provides only a single speed feed motion and the screw portion is, similar to the above examples, overhung at one end of the quill shaft necessitating a critical bearing adjustment arrangement to control runout.

The particular means for providing a two-speed feed drive previously proposed have also not been without significant drawbacks.

A common approach seen in some of the aforementioned patents as well as U.S. Pat. No. 3,283,664 has been to provide a pair of motors driving through either a planetary or screw differential gearing. Such gearing is expensive and the controls tend to be quite complex.

Another approach is to provide a variable speed commutated motor driven at variable speed, but such motors as compared to constant speed induction motors require relatively more maintenance (due to the need for brushes), must be relatively larger to provide adequate low speed torque, and the controls tend to be complex and costly.

Other approaches such as shown in U.S. Pat. No. 2,984,159 have used slow, cumbersome, and costly change speed countershaft gearing which tends to necessitate relatively shorter rapid traverse cycles since the change-over cannot be carried out as accurately and as rapidly, with the ultimate result of increased cycle times.

Accordingly, it is an object of the present invention to provide a two-speed quill mechanical unit drive which minimizes friction and runout and is relatively compact.

It is another object of the present invention to provide a reliable two-speed drive with a minimum of gearing and controls which is capable of accurately controlling the point at which the shift to the lower speed infeed is carried out.

SUMMARY OF THE INVENTION

These and other objects which will become apparent upon a reading of the claims are provided by a two-speed mechanical quill and spindle drive mechanism wherein the quill is advanced by means of a screw formed about its periphery and cooperating with a ball nut driven by a two-speed drive to provide rapid and machining infeed rates. The quill is received within a housing bore and accurately guided for longitudinal movement thereby by means of a sliding engagement with bore surfaces on either side of the nut.

The two-speed drive includes a motor driving the nut directly through gearing during rapid infeed of the quill, but which motor is itself driven through a clutch and reduction gearing by a second motor to produce the slow-speed infeed of the quill and which second motor also rotates the spindle by a driving connection with the splined drive shaft at a reduction during infeed.

DETAILED DESCRIPTION OF THE PREFERRED EMBODIMENT

Figure 1:
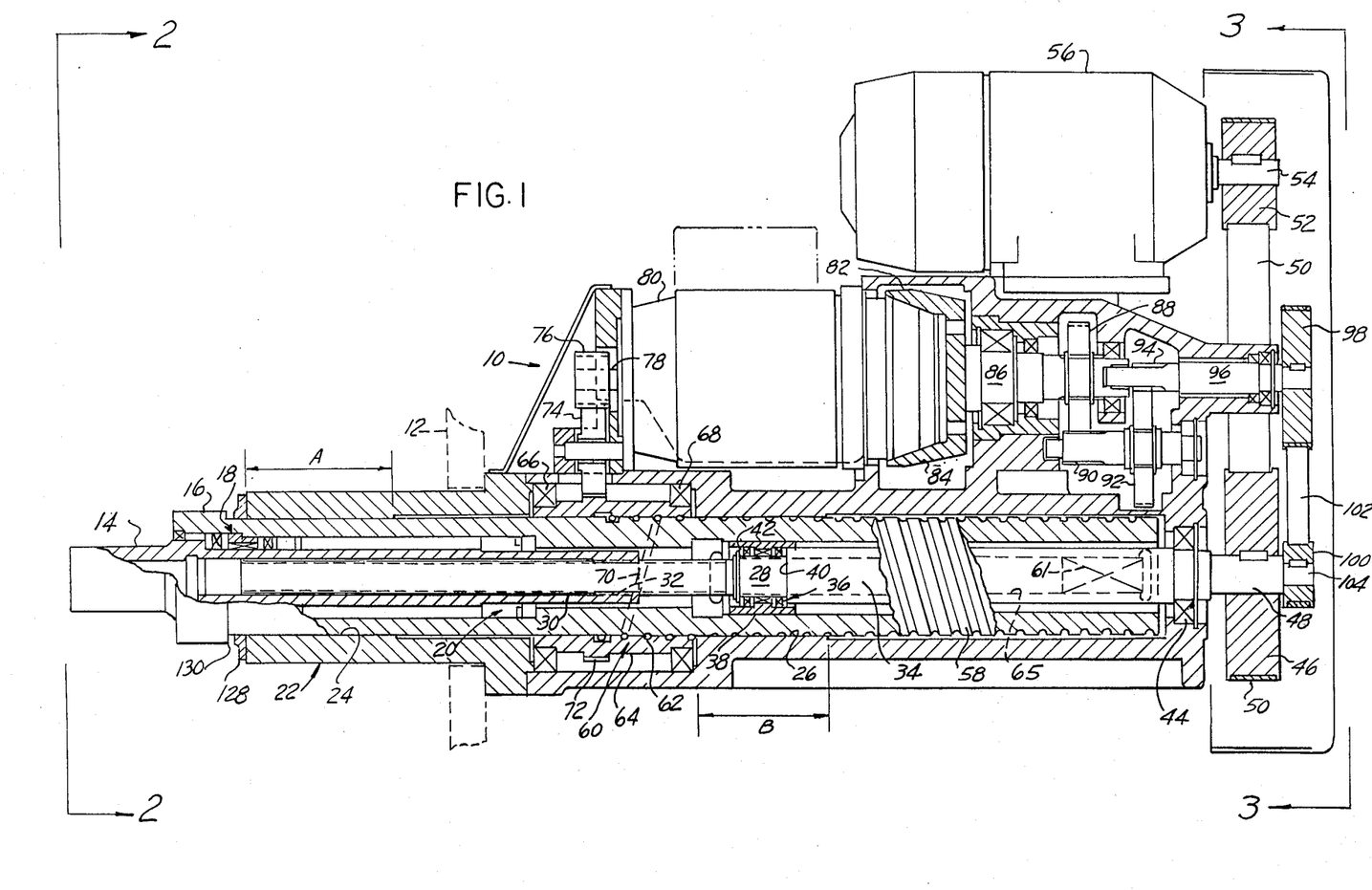
FIG. 1 is a partially sectional view of the two-speed mechanical quill drive unit according to the present invention.
Figure 2:
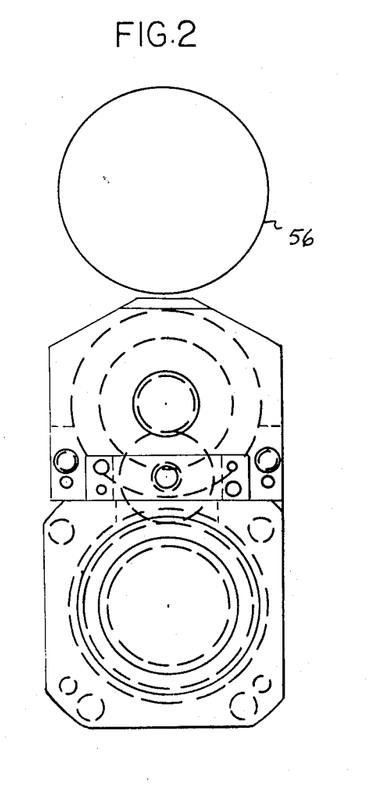
FIG. 2 is a view of the unit shown in FIG. 1 in the direction of the arrows 2—2.
Figure 3:
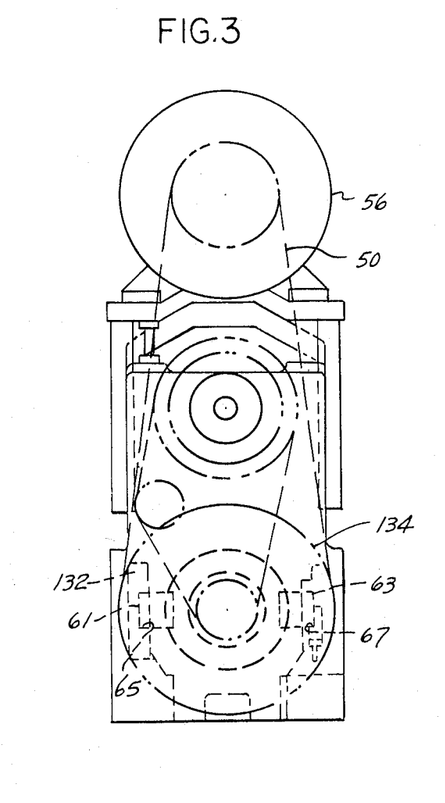
FIG. 3 is a view of the unit shown in the direction of the arrows 3—3 in FIG. 1.

Referring to the drawings, particularly FIGS. 1–3, the mechanical quill unit 10 is depicted in partial section along its longitudinal axis, which is adapted to be piloted to a mounting structure 12.

This unit 10 includes a hollow spindle shaft 14 to which the tool or toolholder (not shown) is to be mounted. The spindle shaft 14 is rotatably mounted within a hollow quill shaft 16 so as to be carried along together with the quill shaft 16 during linear movement thereof radial and thrust bearing sets 18 and 20 being provided for this purpose.

The quill shaft 16 is in turn mounted in the unit housing 22 for sliding movement along its longitudinal axis by means of a slidable fit with two spaced bore surfaces 24 and 26.

The spindle shaft 14 is adapted to be rotated within the quill shaft 16 during machining operations by means of a power shaft 28 having an exteriorly splined portion 30 passing within the spindle shaft 14 and rotatively connected thereto by means of a mating interior spline 32 formed within the spindle shaft 14. It can be seen that this rotative connection will be maintained with relatively linear movement occurring during infeed as will be described herein between the power shaft 28 and the spindle shaft 14 by virtue of this splined connection.

Power shaft 28 is also formed with an extension portion 34 integral with the splined portion 30 and mounted at one end within the quill shaft 16 by means of a thrust and radial load bearing set 36 carried by a sleeve 38 slidable within the quill shaft 16. The bearing set 36 is axially fixed to the extension portion by means of engagement with shoulder 40 and retainer 42. Extension portion 34 is supported at the other end in the housing 22 by means of bearing 44.

The power shaft 28 is rotated by means of a pulley wheel 46 fixed to a reduced end portion 48, the pulley wheel 46 in turn being driven by a belt 50 passing around the pulley wheel and also a smaller pulley wheel 52 affixed to the armature shaft 54 of an electric motor 56.

The quill shaft 16 is adapted to be axially advanced by cam means including a semicircular helical groove 58 formed about its outer periphery, this groove cooperating with a recirculating ball nut arrangement 60 which in turn includes a plurality of balls 62, a drive member constituted by a nut 64 rotatively supported in the housing 22 by radial thrust bearings 66 and 68 and surrounding the quill shaft 16, and a ball return 70. Rotation of the nut 64 which is axially fixed by means of the bearings 66 and 68 thus causes axial advance of the quill shaft 16 in the same manner as the well known recirculating ball screw machines.

The quill shaft 16 is restrained against rotation in housing 22 by means of a pair of keys 61, 63 carried in the exterior of the quill shaft 16 sliding in respective longitudinal slots 65, 67 formed in the housing 22. This arrangement is necessary since the drive of the nut 62 creates a rotative reaction which if not countered would result in no axial movement of the quill shaft 16.

The nut 62 is rotated in the housing 22 by means of gear teeth 72 machined into the outer portion of the nut 62, meshing with an idler gear 74 supported in the housing 22 which is in turn driven by a drive pinion 76 fixed to an output shaft 78 driven by a second electric motor 80.

The second electric motor 80 is of the sliding armature type such that when it is not energized to drive the pinion 76, clutch means including a drive clutch 82 is engaged which allows driving of the motor armature and connected output shaft 78 by means of the clutch driving cone 84, connected shaft 86, and a reduction gear train consisting of gears 88, 90, 92 and 94. Gear 94 in turn is driven by integral shaft 96 having affixed thereto drive pulley 98 driven by belt 102 and drive pulley 100 affixed to a further reduced portion 104 of shaft 34.

Brake motors of the sliding armature type as used in electric motors 56 and 80 are presently commercially available under the trade name DEMAG and hence a greatly detailed description of the same is not here included. However, instead of the usual brake configuration in which deenergization of the motor causes braking of the armature shaft, in the particular application of electric motor 80, a clutching action is created rather than a braking action.

Figure 4:
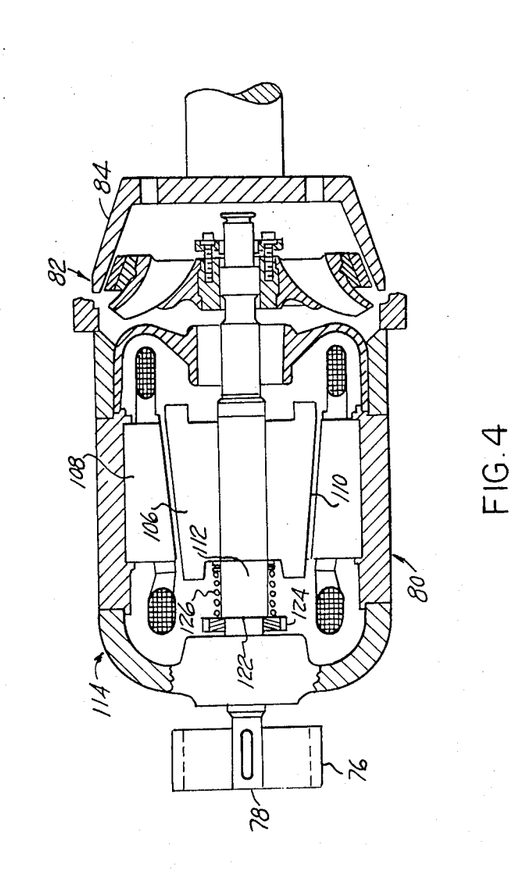
FIG. 4 is a partially sectional view of one of the slidable armature electric motors shown in FIGS. 1–3, depicted in the energized state.
Figure 5:
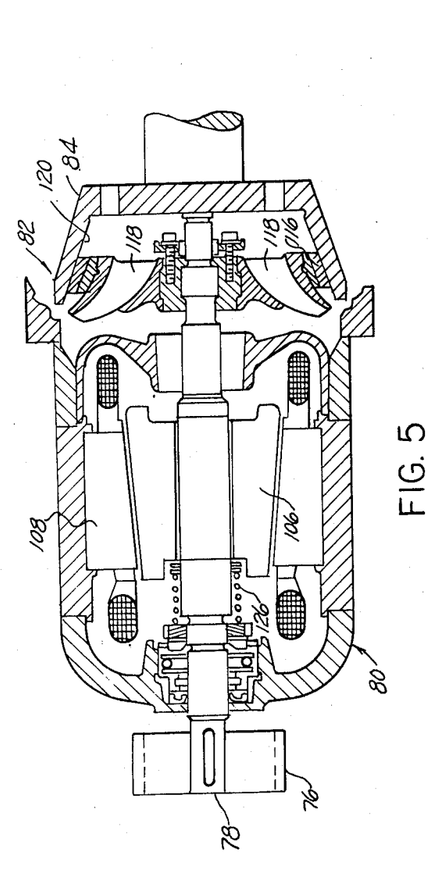
FIG. 5 is a partially sectional view of one of the slidable armature electric motors shown in FIGS. 1–3, depicted in the deenergized state.

Referring to FIGS. 4 and 5 the details of electric motor 80 are shown in FIG. 4 in the energized or declutched state and in FIG. 5 in the deenergized or clutched state.

This type of motor is equipped with a complementarily tapered armature 106 and stator 108 to create a cone-shaped air gap 110.

The armature shaft 112 is mounted for limited axial movement within the housing 114. In the extreme rightward position as shown in FIGS. 4 and 5, a clutch cone 116 affixed to the armature shaft 112 and fan assembly 118 is engaged with the clutch cone face 112 formed on clutch member 84.

In the extreme leftward position as shown in FIG. 4, the armature shaft 112 is positioned with a shoulder 122 against an axially fixed thrust ring 124.

The clutch means is controlled by the axial position of the armature 106 and armature shaft 112 which is in turn controlled by the energization state of the motor. In the deenergized state, bias means comprising a clutch spring 126 produces an axial force which forces the armature shaft to the right to produce engagement of the clutch 82. With power on, the electromagnetically generated forces create an axial force on the armature 106 and armature shaft 112 due to the armature rotor 106 and stator 108, drawing the armature 106 and connected parts to the left against the bias of the clutch spring 126 to disengage the clutch 82.

In order to accommodate this axial movement, idler gear 74 is made somewhat narrower than drive gear 76.

Control of the energization of electric motors 56 and 80 is carried out with the aid of limit switches (not shown) detecting and generating control signals at the positions of the quill shaft in its fully retracted and fully extended condition as well as the selected transition point to low speed infeed. Upon starting up of the unit, the electric motor 56 is energized while electric motor 80 is energized at all positions from fully retracted to the transition point so that the nut 62 is rotated at relatively high speed to cause rapid traverse of the quill shaft 16 (and the spindle shaft 14) to the left as viewed in FIG. 1.

At the selected feed point a control signal is generated by a limit switch or other such means which causes deenergization of electric motor 80, in turn causing engagement of clutch 82. Electric motor 56 which has been rotating the spindle shaft 14 by means of the drive of pulley wheel 46 connected to power shaft 28 begins to also cause slow infeed of the quill shaft 16 via the greatly reduced drive via pulley wheels 100, 98, gear train 94, 92 90 and 88, clutch 82, pinion 76, idler 74, driving the nut 62.

It should be noted that the inertia of the rotor is not significant at the greatly reduced speeds after this reduction, so that the inclusion of the rotor in the drive train does not create excessive inertia forces.

It should also be noted that these controls are extremely simple and reliable since no gear shifting or separate clutch controls are involved. That is, mere energization and deenergization of the motor 80 completely carries out the shift in the operating mode.

In addition, the spring engagement of the clutch 82 not relying on magnetic or electrical fields, etc., insures that the transition can be carried out very accurately. Thus, the transition point can be safely set to utilize the maximum extent of rapid traverse to minimize the time required for a machining cycle.

Positive infeed and outfeed stops are provided respectively by cap 128 and shoulder 130 and by stop blocks 132 and 134 fixed to the housing 22 (FIG. 3) cooperating with keys 61 and 63.

Upon advance of the quill shaft to a point just short of maximum extension of the quill shaft 16, as determined by the position of stop blocks 132 and 134, a third limit switch generates a signal tripping a timer which after a predetermined adjustable delay causes energization of electric motor 80 in a reverse direction to cause rapid retraction of the quill shaft 16. This delay allows a cleanup dwell of the cutting tool if the particular application requires this by continuing rotation of the spindle with the quill shaft 16 stopped by virtue of the engagement of the stop blocks 132 and 134 with keys 61 and 63.

For this application, the stop blocks 132 and 134 can be made to be adjustable so as to provide some flexibility in locating the dwell location (the exact position is of course determined by axial adjustment of the cutting tool in the known manner).

In the event this dwell portion of the cycle is not necessary, the timer and adjustable position stop would not be necessary, and only a conventional limit switch controlled energization and reversal of the motor 80 would be required. A single position positive stop preventing complete removal of the quill shaft 16 would still be desirable.

It can be appreciated that the support arrangement provided for the quill shaft 16, i.e., widely spaced bearing surfaces 24 and 26 disposed on either side of the drive nut and bearing on the helical grooved portion thereof and the concentric alignment of the infeed forces allows very good control of runout even in the fully extended position. Furthermore, this is accomplished with a structure which is relatively compact as a separate bearing support for the spindle shaft axially removed from the quill shaft 16 is not utilized.

It should be noted that the pitch of the helical groove 58 is preferably rather more widely spaced than conventional ball screws to allow good bearing contact of the O.D. of the quill shaft 16 lying between revolutions of the groove 58 with the bearing surfaces 24 and 26.

The spindle shaft 14 rotative drive is also extremely compact being contained almost entirely within the confines of the quill shaft 16 while being well supported by the bearing sets.

It, therefore, can be appreciated that a two-speed mechanical quill drive has been provided which is compact while controlling runout very effectively, and which can be controlled very simply and reliably with a minimum of control and drive train components.

Figure 6:
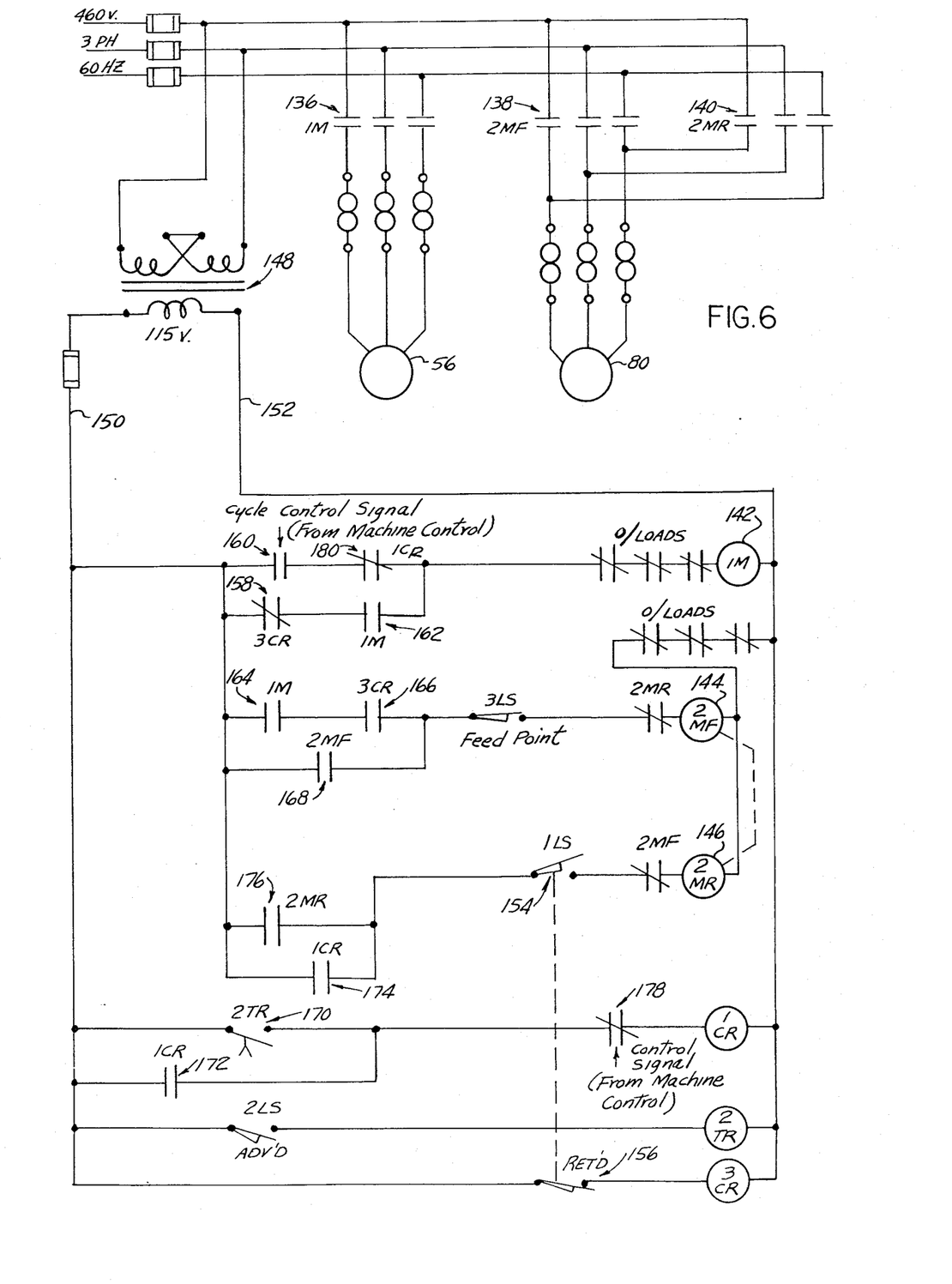
FIG. 6 is a relay logic diagram of a typical control circuit for a quill unit according to the present invention.

FIG. 6 depicts a typical control relay logic diagram for such a quill unit.

In this circuit energization of the electric motors 56 and 80 is controlled by sets of normally open contacts 136, 138 and 140 which are closed respectively by means of a first motor control coil 142, and second motor control coils 144 (forward) and 146 (reverse).

This circuit receives power from a step down transformer 148 via lines 150, 152 and energizes the motor control coils 142, 144, and 146 depending on the state of a network of various relays, timers and limit switches to be described herein to thereby control the electric motors 56 and 80.

In the condition shown, the quill unit is in the fully retracted position, in which the retract limit switch 165 has one contact set 154 open and another contact set 156 closed.

Contact set 156 thus energizes relay coil 3CR which opens the normally closed contact set 158.

To initiate a quill unit cycle, a cycle control signal received from the machine control circuit is applied to a normally open relay contact 160 to close the relay contacts and energize the first motor control coil 142 to initiate rotation of the electric motor 56.

At the same time the first motor control coil 142 closes contact sets 162 and 164.

A normally open relay contact set 166 in series with contact set 164 is at this time in a closed condition by virtue of the energization of the relay coil 3CR as previously described. At the same time the feed point limit switch 3LS is closed so that the second motor control coil 144 is energized to activate the electric motor 80 so that the quill unit is rapidly advanced. The second motor control coil 144 also at the same time pulls in normally open contact set 168 so that it will remain energized regardless of the condition of relay contact sets 164 or 166.

The cycle control signal is of sufficient duration so that the retract limit switch 1LS is moved to the nonretracted position, closing relay contact set 158 so that electric motor 56 remains energized after the cycle ends.

This rapid advance of the quill unit occurs until the feed point is reached, which results in the 3LS limit switch being opened deenergizing motor control coil 144 and electric motor 80 so that slow infeed due to rotation occurs.

When the quill unit has advanced to a point a short distance (on the order of ⅛ inch) from the full advanced position, the advanced limit switch 2LS is closed, which activates a timer relay 2TR, which after a predetermined and adjustable time delay momentarily pulls in timer contact set 170, in turn energizing the depth relay coil 1CR. Depth relay coil 1CR pulls in normally open contact set 172 so that it will remain energized after reopening of the relay contact set 170 and at the same time closes contact set 174. Since contact set 154 has been closed by advance of the quill unit from the retracted position, the reverse second motor control coil 146 is energized pulling in relay contact set 176 and activating the second electric motor 80 in a reverse direction, causing the quill unit to be rapidly retracted until the retract limit switch is tripped into the condition shown in FIG. 6. At this point relay contact set 158 is reopened deenergizing motor control relay coil 142 and deactivating electric motor 56. Limit switch contact set 154 is also opened deenergizing motor control relay coil 146 so that the electric motor 80 is no longer activated in the reverse direction. Electric motor 80 is also prevented from being activated in the forward direction because of the reclosing of relay contact set 164 by the deenergization of motor control coil 142.

To reset the depth relay 1CR which holds itself in with relay contact set 172, a machine control signal may be applied to normally closed relay 178 to deenergize relay coil 1CR before the next cycle.

Also, a normally closed relay contact set 180 may be included which is opened by depth relay 1CR so that if a cycle begin signal is applied with some quill units in mid-cycle, only those quill units which have not reached the full advance position are activated.

FIGS. 7-11 show a quill unit in which certain design refinements have been incorporated.

Figure 7:
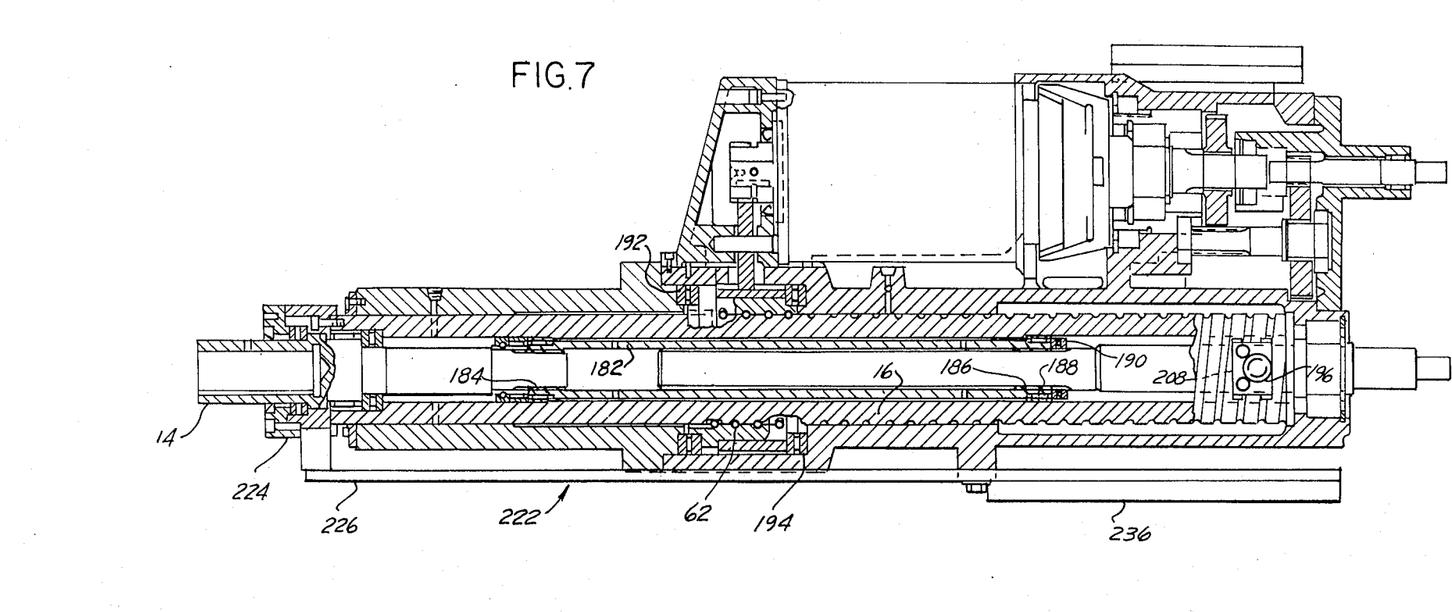
FIG. 7 is a partially sectional view of another embodiment of a quill unit according to the present invention.

Firstly referring to FIG. 7, an intermediate tube 182 splined to the spindle shaft 14 (at 184) and to the power shaft (at 186) is utilized. The primary benefit of this arrangement is the elimination of the need for the slidable sleeve 38 in addition to rotary bearing sets 188, 190 since relative sliding movement between the sleeve and the quill shaft 16 does not occur. This allows the diameter of the mating splines to be somewhat larger contributing greatly to their strength.

A second refinement involves the substitution of a pure thrust bearing 192 and 194 supporting the nut 64 which is located radially by the balls and the exterior of the quill shaft 16. These bearings 192 and 194 are cheaper than combined radial-thrust bearings and also the resulting radial "float" of the nut member allows some runout of the nut member without excessive loading of the bearing sets.

Rather than sliding keys 61, 63 a pair of cam follower rollers 196, 198 are mounted to the quill shaft 16 and rolling in longitudinal slots 200, 202 formed in side plates 204 and 206 fixed to the housing 22 (FIGS. 7, 8 and 10) are utilized to prevent rotation of the quill shaft. This arrangement reduces the frictional losses created by sliding keys 61, 63.

A pair of stop blocks 209 and 210 are fixed to the quill shaft 16 which cooperate with a corresponding pair of stop blocks 212 and 214 fixed to the housing 22 to provide the positive stop previously described.

Figure 8:
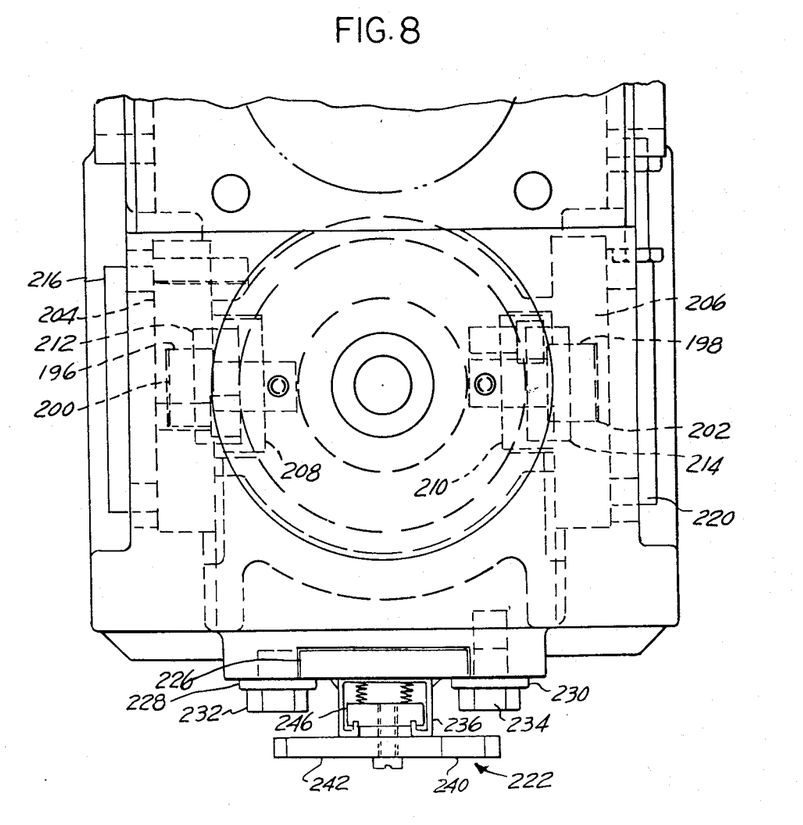
FIG. 8 is a rear elevational view of the quill unit shown in FIG. 7.
Figure 9:
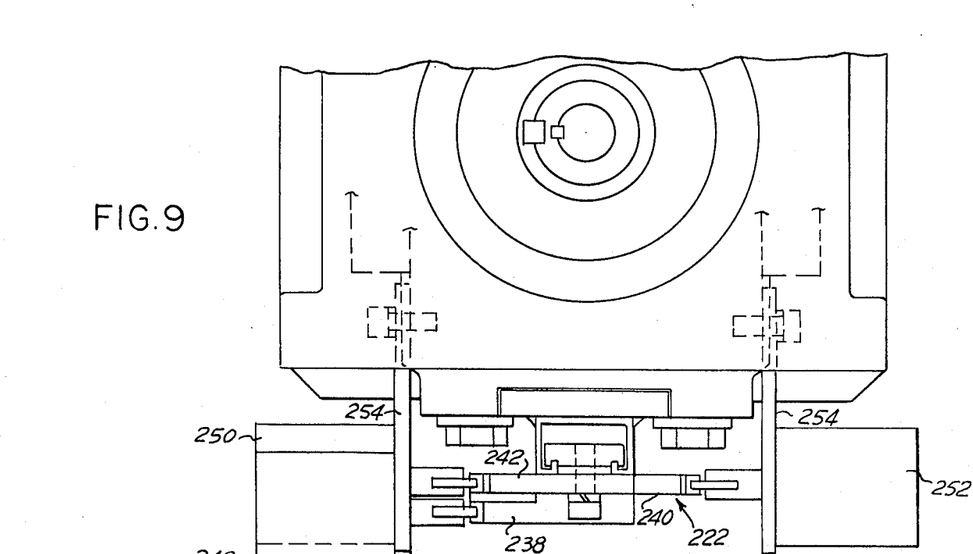
FIGS. 9–12 are fragmentary views of portions of the quill unit shown in FIG. 7 showing the installation of the limit switches.
Figure 10:
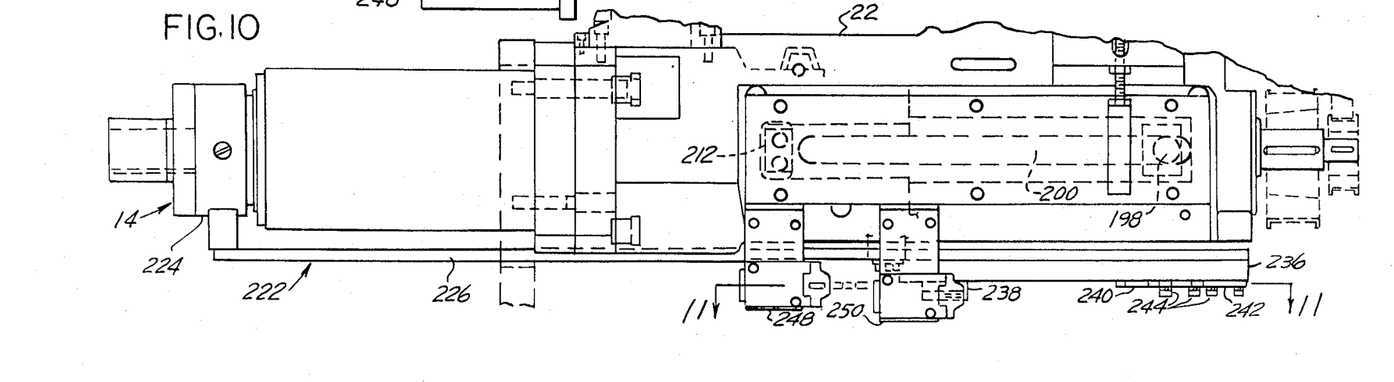
Figure 11:
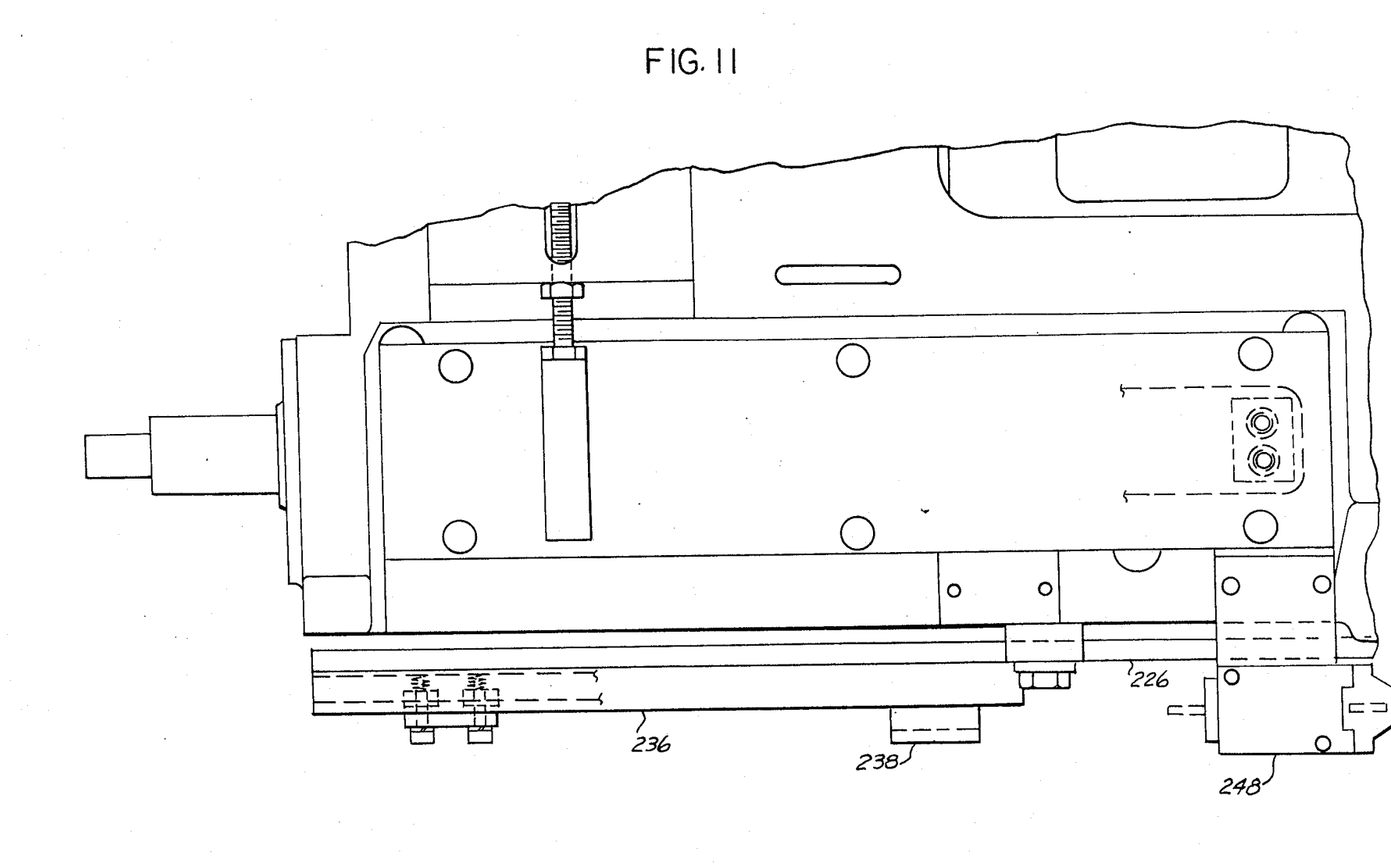
Figure 12:
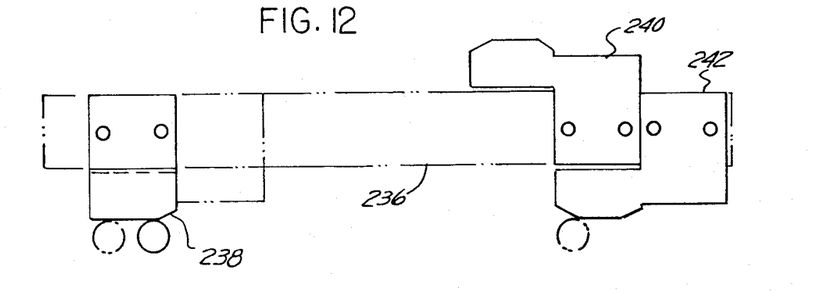

As can be seen in FIG. 8, the overlap of these stop blocks 208 and 212 and 214 is within the O.D. of the quill shaft 16 minimizing the overhang so that an extremely rigid stop is provided.

An advantageous arrangement for tripping of the limit switches as described above is also incorporated in this design. If the limit switches were tripped by means of dogs extending out of the housing in the vicinity of the stop blocks, exposed slots would be necessary allowing the entry of dirt, chips and leakage of grease.

In this design, the slots are covered with plates 216, 220 and a limit switch dog assembly 222 moved longitudinally by the front exposed portion 224 of the spindle 14 is provided.

The limit switch dog assembly 222 includes a plate 226 affixed to the spindle 14 and extending rearwardly over a pair of thrust washers 228, 230 supported by bolts 232, 234.

Welded to plate 226 is a channel section 236. The limit switch dogs 238, 240 and 242 are adjustably mounted in the channel 236 by means of cap screws 244 and slide nuts 246.

Limit switches 248, 250, and 252 are mounted to the housing 22 on straps 254.

Figure 13:
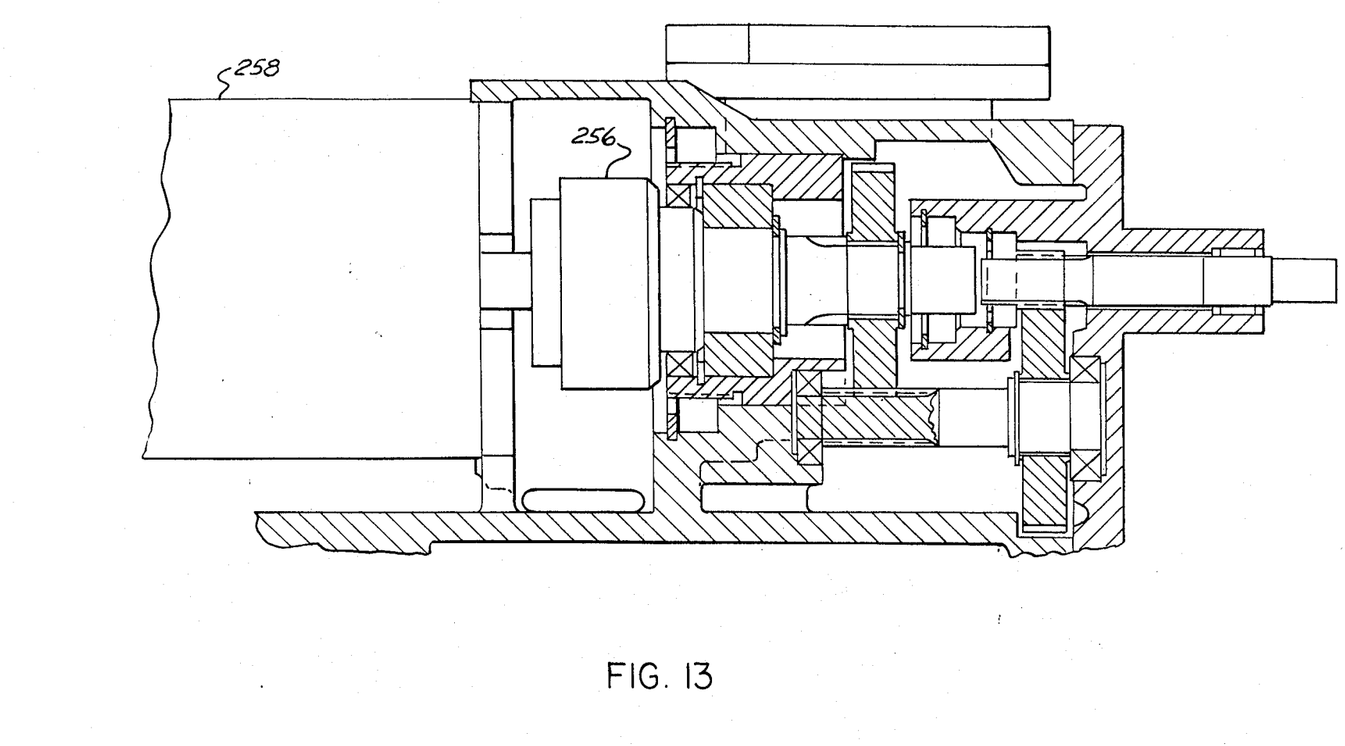
FIG. 13 is a fragmentary view in partial section of another embodiment of the quill unit according to the present invention.

Referring to FIG. 13, an alternate embodiment is shown in which a separate clutch 256 is used with a conventional electric motor 258 instead of the sliding armature type described above. This approach does not, however, have the advantage of the simplified controls as the above-described approach since separate motor and clutch controls are necessitated.

What is claimed is:

1. A two-speed quill drive comprising:
   a quill shaft mounted for sliding movement along its longitudinal axis;
   a spindle shaft rotatably mounted for rotation with respect to said quill shaft, adapted to be carried therewith during said longitudinal movement of said quill shaft;
   a first motor;
   a second motor having an armature and an armature shaft connected to said armature;
   means for producing longitudinal advancing movement of said quill shaft, said means including drive means drivingly connecting said second motor armature shaft and said quill shaft so as to cause said longitudinal movement of said quill shaft in response to rotation of said armature shaft;
   means drivingly connecting said first motor and said spindle shaft so that said spindle shaft is rotated by said first motor; and
   means drivingly connecting said second motor armature shaft and said first motor whenever said second motor is deenergized whereby said first motor is adapted to rotate said spindle shaft and is also adapted to longitudinally advance said quill shaft through said second motor armature shaft.

2. The quill drive of claim 1 wherein said means drivingly connecting said first motor and said second motor armature shaft includes reduction gearing, whereby said quill shaft is advanced at a slower rate by said first motor than by said second motor.

3. The quill drive of claim 1 wherein said second motor is an electric motor of the sliding armature type in which said second motor has a tapered armature and stator, said sliding armature axially moved in one direction by energization of said stator and armature;
   said second motor also including bias means urging said armature in the other axial direction by means of an axially directed force; and
   said quill drive also including clutch means drivingly connecting said first motor and said second motor armature shaft said clutch means controlled by said sliding armature of said second motor such that said clutch is engaged by said bias means whenever said second motor is deenergized.

4. The quill of claim 3 wherein said means drivingly connecting said first motor and said second motor and said second motor armature shaft include reduction gearing, whereby said quill shaft is advanced to a slower rate by said first motor than by said second motor.

5. The quill drive of claim 1 wherein said means drivingly connecting said second motor armature shaft and said quill shaft includes a ball screw drive including a nut member rotated by said second motor armature shaft.

6. The quill drive of claim 1 wherein said means drivingly connecting said first motor and said second motor armature shaft includes a shaft drivingly connected to said spindle shaft and also includes reduction gearing driven by said shaft, and further includes means drivingly connecting said reduction gearing to said armature shaft whenever said second motor is deenergized.

7. A two-speed quill drive comprising:
a housing;
a hollow quill shaft;
a drive member rotatably mounted in said housing surrounding said quill shaft and fixed against axial movement;
means mounting said quill shaft in said housing for slidable longitudinal movement along its axis;
cam means drivingly connecting said quill shaft and said drive member producing said longitudinal movement of said quill shaft upon rotation of said drive member in said housing;
means for rotating said drive member at two different rotative speeds to provide a rapid and slow infeed of said quill shaft said means including:
a first motor, a second motor having an armature and an armature shaft connected to said armature, means for producing longitudinal advancing movement of said quill shaft said means including drive means drivingly connecting said second motor armature shaft and said quill shaft so as to cause said longitudinal movement of said quill shaft in response to rotation of said armature shaft, means drivingly connecting said first motor and said spindle shaft so that said spindle shaft is rotated by said first motor, means drivingly connecting said second motor armature shaft and said first motor whenever said second motor is deenergized whereby said first motor is adapted to rotate said spindle shaft and is also adapted to longitudinally advance said quill shaft through said second motor armature shaft;
a spindle shaft rotatably mounted within said quill shaft and adapted to be carried by said quill shaft with said longitudinal movement; and
means for rotating said spindle shaft in said quill shaft while said quill shaft is undergoing said longitudinal movement in said housing.

8. The quill drive of claim 7 wherein said second motor is an electric motor of the sliding armature type in which said second motor has a tapered armature and stator, said sliding armature axially moved in one direction by energization of said stator and armature;
said second motor also including bias means urging said armature in the other axial direction by means of an axially directed force; and
said means drivingly connecting said first motor and said second motor armature shaft including clutch means drivingly connecting said first motor and said second motor armature shaft said clutch means controlled by said sliding armature of said second motor such that said clutch is engaged by said bias means whenever said second motor is deenergized.

9. The quill drive of claim 7 wherein said means for producing said longitudinal movement of said quill shaft includes a ball screw drive including a nut member drivingly connected to said second motor armature shaft.

10. The quill drive of claim 7 wherein said means drivingly connecting said first motor and said second motor armature shaft includes a shaft drivingly connected to said spindle shaft and also includes reduction gearing driven by said shaft, and further includes means drivingly connecting said reduction gearing to said armature shaft whenever said second motor is deenergized.

11. The quill drive of claim 7 wherein said means drivingly connecting said first motor and said second motor armature shaft includes reduction gearing, whereby said quill shaft is advanced at a slower rate by said first motor than by said second motor.

12. The quill of claim 11 wherein said means drivingly connecting said first motor and said second motor armature shaft includes reduction gearing, whereby said quill shaft is advanced at a slower rate by said first motor than by said second motor.

* * * * *